US011878508B2

(12) United States Patent
Schaede

(10) Patent No.: US 11,878,508 B2
(45) Date of Patent: Jan. 23, 2024

(54) INTAGLIO GRAVURE PRINTING PRESS AND METHOD FOR APPLYING AT LEAST ONE PRINTING FLUID ONTO AT LEAST ONE SUBSTRATE

(71) Applicant: KOENIG & BAUER AG, Würzburg (DE)

(72) Inventor: Johannes Schaede, Würzburg (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 17/787,690

(22) PCT Filed: Oct. 26, 2020

(86) PCT No.: PCT/EP2020/080021
§ 371 (c)(1),
(2) Date: Jun. 21, 2022

(87) PCT Pub. No.: WO2021/139910
PCT Pub. Date: Jul. 15, 2021

(65) Prior Publication Data

US 2023/0012947 A1 Jan. 19, 2023

(30) Foreign Application Priority Data

Jan. 10, 2020 (DE) ..................... 10 2020 100 442.7

(51) Int. Cl.
*B41F 9/08* (2006.01)
*B41F 9/02* (2006.01)

(52) U.S. Cl.
CPC ................ *B41F 9/08* (2013.01); *B41F 9/021* (2013.01); *B41F 9/023* (2013.01)

(58) Field of Classification Search
CPC ............. B41F 9/08; B41F 9/021; B41F 9/023
See application file for complete search history.

(56) References Cited

U.S. PATENT DOCUMENTS 5,816,619 A * 10/1998 Schaede ................. B42D 25/29 283/67
2001/0011507 A1 8/2001 Korem
(Continued)

FOREIGN PATENT DOCUMENTS

DE 69631782 T2 3/2005
DE 102010010785 A1 9/2011
(Continued)

OTHER PUBLICATIONS

EP 2 985 510 machine translation, 2016 (Year: 2016).*
International Search Report of PCT/EP2020/080021 dated Feb. 1, 2021.

*Primary Examiner* — Matthew G Marini
*Assistant Examiner* — Leo T Hinze
(74) *Attorney, Agent, or Firm* — MATTINGLY & MALUR, PC

(57) ABSTRACT

In some examples, an intaglio gravure printing press includes at least one gravure printing unit having at least one forme cylinder, at least one impression cylinder, at least one inking unit and/or at least one ink collecting cylinder. Additionally, at least one assigned inking unit, at least one print head, and at least one wiping device are arranged at the at least one forme cylinder. The wiping device is arranged along the direction of rotation of the forme cylinder, and downstream from the print head when the print head is arranged at the at least one forme cylinder. In addition, the wiping device is arranged along the direction of rotation of the forme cylinder, upstream from a contact region of the forme cylinder with the impression cylinder. Alternatively, in some examples, at least one print head is arranged at the at least one impression cylinder.

20 Claims, 4 Drawing Sheets

(56) References Cited

U.S. PATENT DOCUMENTS

| | | | | |
|---|---|---|---|---|
| 2006/0213384 A1* | 9/2006 | Reinhard | G07D 7/12 |
| | | | 101/216 |
| 2009/0128610 A1 | 5/2009 | Taniuchi et al. | |
| 2016/0001577 A1* | 1/2016 | Kodama | B41M 1/10 |
| | | | 347/102 |
| 2018/0001613 A1 | 1/2018 | Kamoda | |
| 2018/0215136 A1* | 8/2018 | Schaede | B41F 23/08 |

FOREIGN PATENT DOCUMENTS

| | | | | |
|---|---|---|---|---|
| DE | 102012017284 A1 | 3/2014 | |
| DE | 102013223826 A | 5/2015 | |
| EP | 2979867 A | 2/2016 | |
| EP | 2982510 A1 * | 2/2016 | B41F 13/46 |

* cited by examiner

INTAGLIO GRAVURE PRINTING PRESS AND METHOD FOR APPLYING AT LEAST ONE PRINTING FLUID ONTO AT LEAST ONE SUBSTRATE

CROSS-REFERENCES TO RELATED APPLICATIONS

This application is the US national phase, under 35 USC § 371, of PCT/EP2020/080021, filed on Oct. 26, 2020, published as WO 2021/139910 A1 on Jul. 15, 2021, and claiming priority to DE 10 2020 100 442.7, filed Jan. 10, 2020, the disclosures of which are expressly incorporated by reference herein in their entireties.

TECHNICAL FIELD

Some examples herein relate to an intaglio gravure printing press at least one gravure printing unit, comprising at least one forme cylinder and at least one impression cylinder, at least one inking unit and/or at least one ink collecting cylinder, including at least one assigned inking unit arranged at the at least one forme cylinder. The intaglio gravure printing press further includes at least one print head, which is arranged at the at least one forme cylinder, at least one wiping device arranged at the at least one forme cylinder, the at least one wiping device arranged along the direction of rotation of the at least one forme cylinder, downstream from the at least one print head, when the at least one print head is arranged at the at least one forme cylinder.

Some examples herein relate to an intaglio gravure printing press that includes at least one gravure printing unit, having at least one forme cylinder and at least one impression cylinder, at least one inking unit and/or at least one ink collecting cylinder, including at least one assigned inking unit, that is arranged at the at least one forme cylinder.

Some examples herein relate to a method for applying at least one printing fluid onto at least one substrate with at least one intaglio gravure printing press including at least one gravure printing unit including at least one forme cylinder and at least one impression cylinder, the at least one forme cylinder having at least one printing plate including at least one engraving, at least one inking unit and/or at least one ink collecting cylinder, including at least one assigned inking unit that inks the at least one engraving of the at least one forme cylinder with at least one printing fluid embodied as ink, the at least one printing fluid embodied as ink applied onto the at least one substrate. The intaglio gravure printing press includes at least one print head at least one printing fluid that is different from the printing fluid embodied as ink indirectly applied onto the at least one substrate by means of the at least one print head, the at least one print head indirectly applying its printing fluid onto the at least one substrate means of the at least one forme cylinder inked by the at least one print head.

Some examples herein relate to a method for applying at least one printing fluid onto at least one substrate with at least one intaglio gravure printing press comprising at least one gravure printing unit comprising at least one forme cylinder and at least one impression cylinder, the at least one forme cylinder including at least one printing plate including at least one engraving, at least one inking unit and/or at least one ink collecting cylinder, including at least one assigned inking unit, inking the at least one engraving of the at least one forme cylinder with at least one printing fluid embodied as ink. The at least one printing fluid that is embodied as ink is applied onto the at least one substrate, and the intaglio gravure printing press includes at least one print head.

BACKGROUND

DE 10 2013 223 826 A1 discloses a gravure printing press comprising a forme cylinder and an impression cylinder.

EP 2 979 867 A1 discloses a printing press comprising a cylinder, which comprises a printing plate including recesses. Ink is filled in the recesses of the printing plate by way of an ink jet printer. The ink is transferred onto a printing substrate and dried before the printing substrate is peeled off the cylinder.

DE 696 31 782 T2 teaches a printing system comprising a print element, configured as a gravure cylinder, for selectively receiving ink in an ink receiving area, configured as recesses, including multiple ink-receiving dots. An ink image is formed on a portion of the ink-receiving dots by at least one printing unit for applying ink onto the print element. The ink image is transferred onto a print substrate by a transfer system comprising a printing cylinder.

US 2018/0001613 A1 discloses a printing press comprising an intaglio gravure printing unit. An ink collecting cylinder is arranged at the forme cylinder. A wiping cylinder removes excess printing ink from the forme cylinder. Movable inking units are arranged at the ink collecting cylinder.

US 2009/128610 A1 discloses a printing device, wherein a first application unit, a second application unit and a third application unit are arranged in this order at a forme cylinder downstream from a press nip in a direction of rotation. The first application unit applies a liquid which improves the wettability of the surface of the forme cylinder. The second application unit applies a liquid which lowers the flowability of ink on the forme cylinder. The third application unit, this being an ink jet print head, applies ink onto the forme cylinder. A wiping device comprising a wiping cylinder, for example, is arranged upstream from the first application unit in the direction of rotation of the forme cylinder.

DE 10 2012 017 284 A1 teaches a device for printing onto printing substrate, which comprises a first printing press cylinder making contact with the printing substrate in a press nip, and a second printing press cylinder. The second printing press cylinder transfers a print image of a first printing ink, which was previously applied to this cylinder, onto the printing substrate. An ink jet printing device directly applies an additional variable print image made of ink onto an ink-free circumferential section of the second printing press cylinder.

SUMMARY

It is the object of the invention to devise an intaglio gravure printing press and a method for applying at least one printing fluid onto at least one substrate.

The object is achieved in that the at least one wiping device is arranged along the direction of rotation of the at least one forme cylinder, upstream from a contact region of the at least one forme cylinder with the at least one impression cylinder, or that the intaglio gravure printing press comprises at least one print head, which is arranged at the at least one impression cylinder. The object is further achieved by the intaglio gravure printing press including at least one print head, which is arranged at the at least one impression cylinder. The object is further achieved in a method in which at least one print head inks the at least one engraving with the printing fluid of the at least one print head prior to the at least one engraving being inked with the printing fluid that is embodied as ink. The object is further achieved in a method in which at least one printing fluid that differs from the printing fluid embodied as at least one ink is directly applied onto the at least one substrate by means of the at least one print head, and the at least one print head directly applies its printing fluid onto the at least one substrate at the at least one impression cylinder along a transport path of the at least one substrate, downstream from at least one printing nip between the at least one forme cylinder and the at least one impression cylinder. The dependent claims show advantageous refinements and/or embodiments of the identified solution.

The advantages to be achieved with the invention are, in particular, that a compact and easy to handle printing press, configured as an intaglio gravure printing press, is devised. The intaglio gravure printing press, is preferably configured for printing securities. The intaglio gravure printing press is advantageously characterized by comprising at least one forme cylinder, which advantageously comprises at least one printing plate including at least one engraving. The intaglio gravure printing press, advantageously comprises at least one transport means for feeding substrate to the at least one forme cylinder and/or at least one impression cylinder. At least one inking unit and/or at least one ink collecting cylinder, to which in each case at least one inking unit is assigned, are arranged at the at least one forme cylinder. The intaglio gravure printing press, the at least one gravure printing unit, comprises at least one print head, in particular at least one non-impact print head, and/or ink jet print head, which is arranged at the at least one forme cylinder or at the at least one impression cylinder. Advantageously, the at least one printing plate is only inked and/or can only be inked with printing fluid inside the at least one engraving by means of the at least one print head, in particular the ink jet print head. This enables a particularly thin configuration of the width and/or a fine line width of the at least one engraving of the at least one printing plate. The printing fluid is advantageously in each case finely metered on the at least one printing plate. Printing fluids that differ from one another can advantageously be arranged on the printing plate in two mutually adjoining and/or two mutually adjacent engravings, without the printing fluids mixing with one another. Through the use of the at least one print head, in particular ink jet print head, an economical consumption of printing fluid is advantageously ensured. Additionally, a change of printing fluid can be easily carried out and/or is easily carried out. The fine metering of printing fluid on the at least one printing plate by the at least one print head, in particular ink jet print head, is advantageously configured to generate a high color resolution on the at least one substrate, in particular a respective copy of the at least one substrate.

For example, by arranging at least one wiping device at the at least one forme cylinder, excess printing fluid can be removed and/or is removed before being applied to the at least one substrate.

Printing fluids, which are used in particular in gravure printing, have a high drying duration. These are therefore not dry, for example, when a printed substrate reaches at least one delivery of the gravure printing press. This results in smearing of the printing fluid on the relevant substrate and/or in an undesirable transfer of printing fluid onto an adjoining substrate or onto parts, for example a side located opposite the printed side, of an adjoining substrate in the delivery. A pile height of a delivery pile in the case of sheet-format substrate is thus additionally limited to a maximum of 100 substrates, preferably a maximum of 300 substrates, and preferably a maximum of 500 substrates. The arrangement and/or use of at least one print head advantageously allows an improvement of these described disadvantages. Advantageously, at least one protective layer and/or at least one protective film are generated on the substrate, which are configured to prevent printing fluid from smearing, in particular in the at least one delivery. At least the printing fluid that was discharged by the at least one print head is advantageously dried prior to the substrate arriving in the delivery and/or prior to a sheet-format substrate being deposited onto a delivery pile or prior to a web-format substrate being rolled up in the delivery. Advantageously, a pile height of at least 100 substrates, preferably of at least 300 substrates, more preferably of at least 500 substrates, more preferably of at least 800 substrates, is thus possible in the at least one delivery pile.

In an advantageous embodiment, the intaglio gravure printing press is characterized in that the at least one print head, in particular the at least one ink jet print head, by way of which the at least one engraving can be inked and/or is inked with at least one printing fluid, is arranged at the circumference of the at least one forme cylinder. Advantageously, a gravure printing unit of the gravure printing press, preferably an intaglio gravure printing press, comprises at least the at least one forme cylinder and the at least one print head, in particular the at least one ink jet print head, and the at least one impression cylinder. The gravure printing press, preferably the intaglio gravure printing press, is in particular characterized by a simple design, in particular of the gravure printing unit of the gravure printing press. A complex printing fluid supply to the at least one forme cylinder via at least one cylinder provided upstream from the forme cylinder along the path of printing fluid, for example at least one ink collecting cylinder and/or at least one chablon cylinder and/or at least one duct roller, is dispensed with in the advantageous embodiment of the gravure printing press.

Further advantages are apparent from the following description.

BRIEF DESCRIPTION OF THE DRAWINGS

Exemplary embodiments of the invention are illustrated in the drawings and will be described in greater detail below. The drawings show.

DETAILED DESCRIPTION

Figure 1:
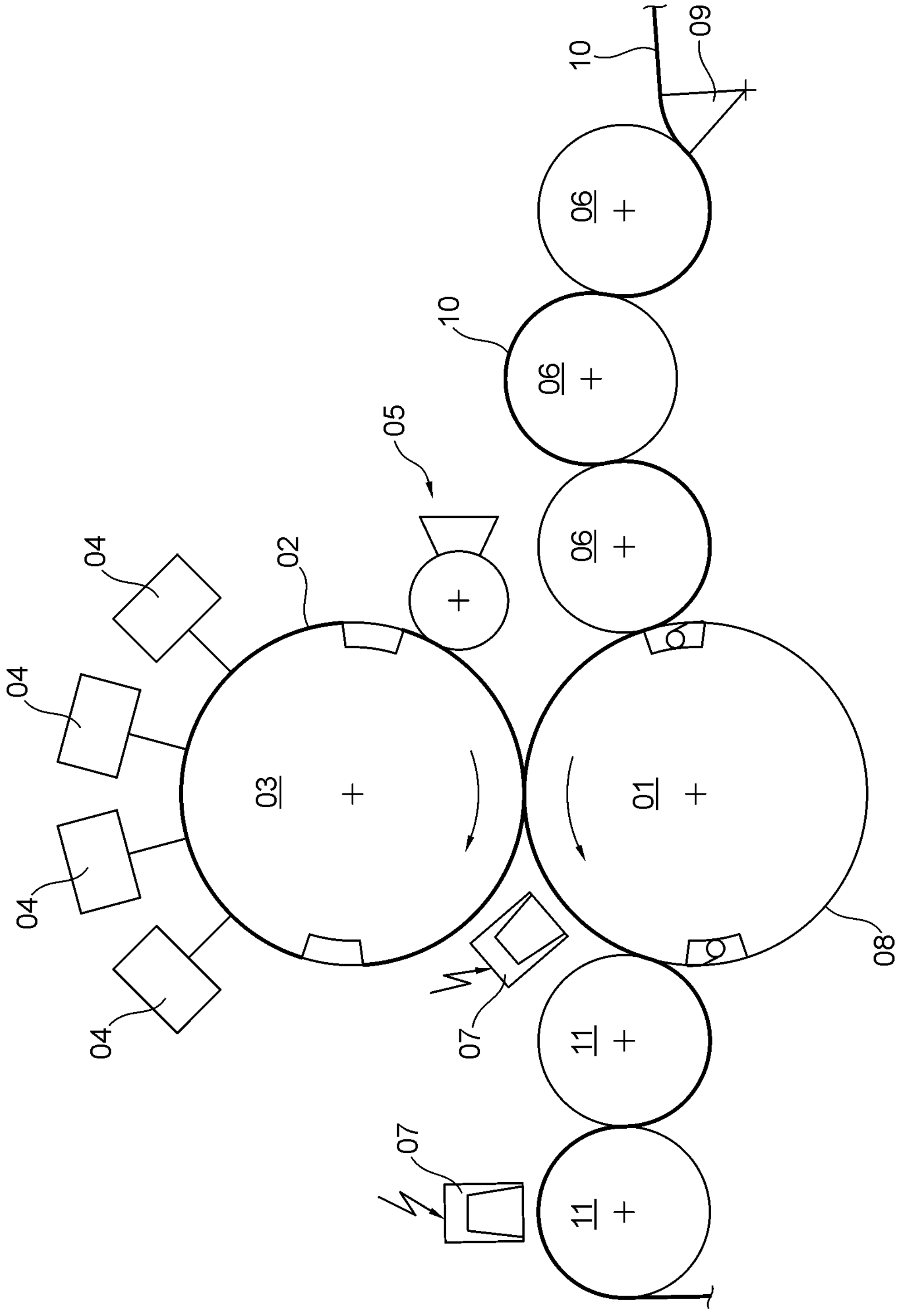
FIG. 1 a schematic illustration of a gravure printing press comprising at least one ink jet print head for applying printing fluid.
Figure 2:
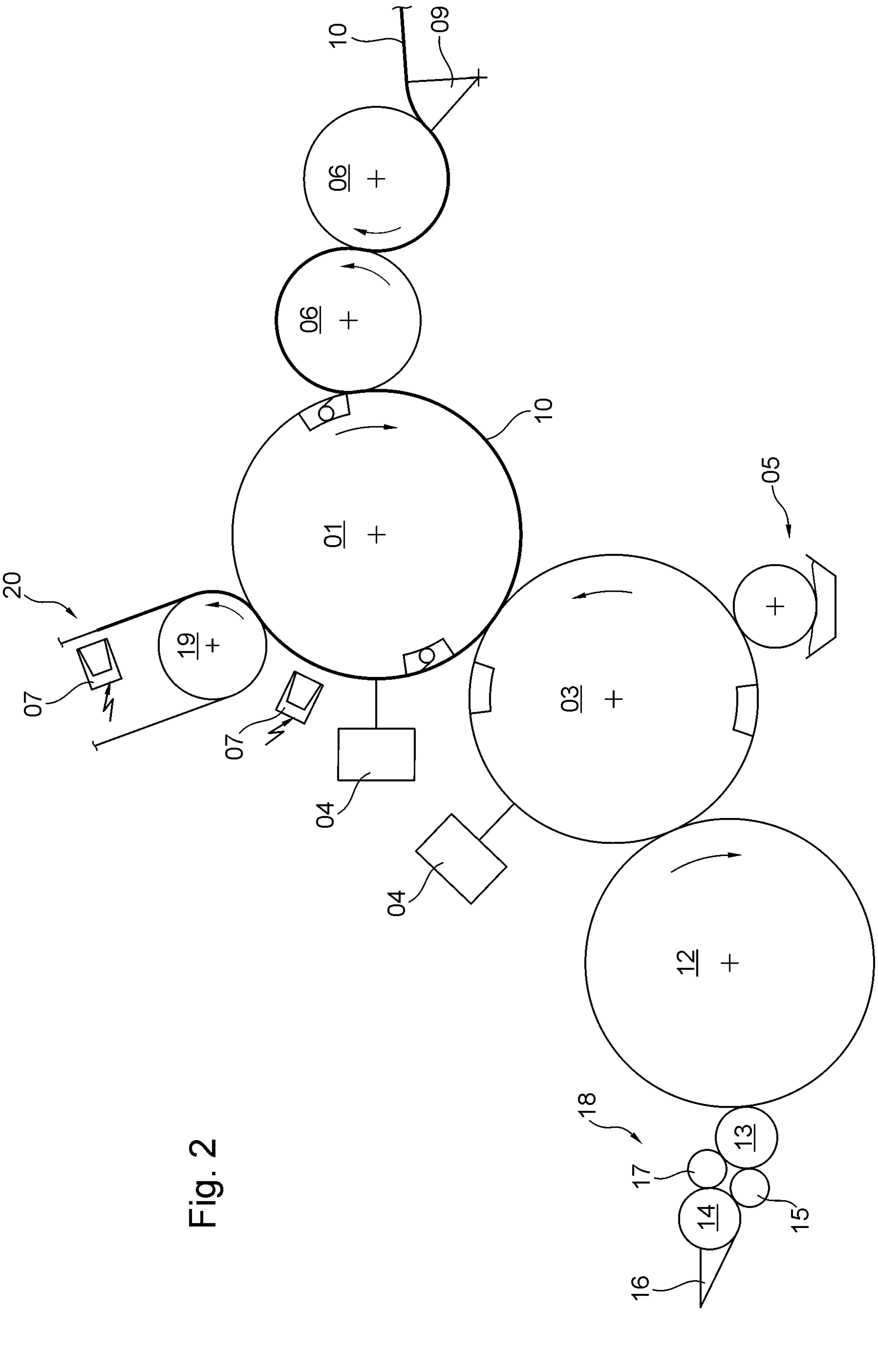
FIG. 2 a schematic illustration of an alternative gravure printing press comprising at least one inking unit and at least one ink jet print head.
Figure 3:
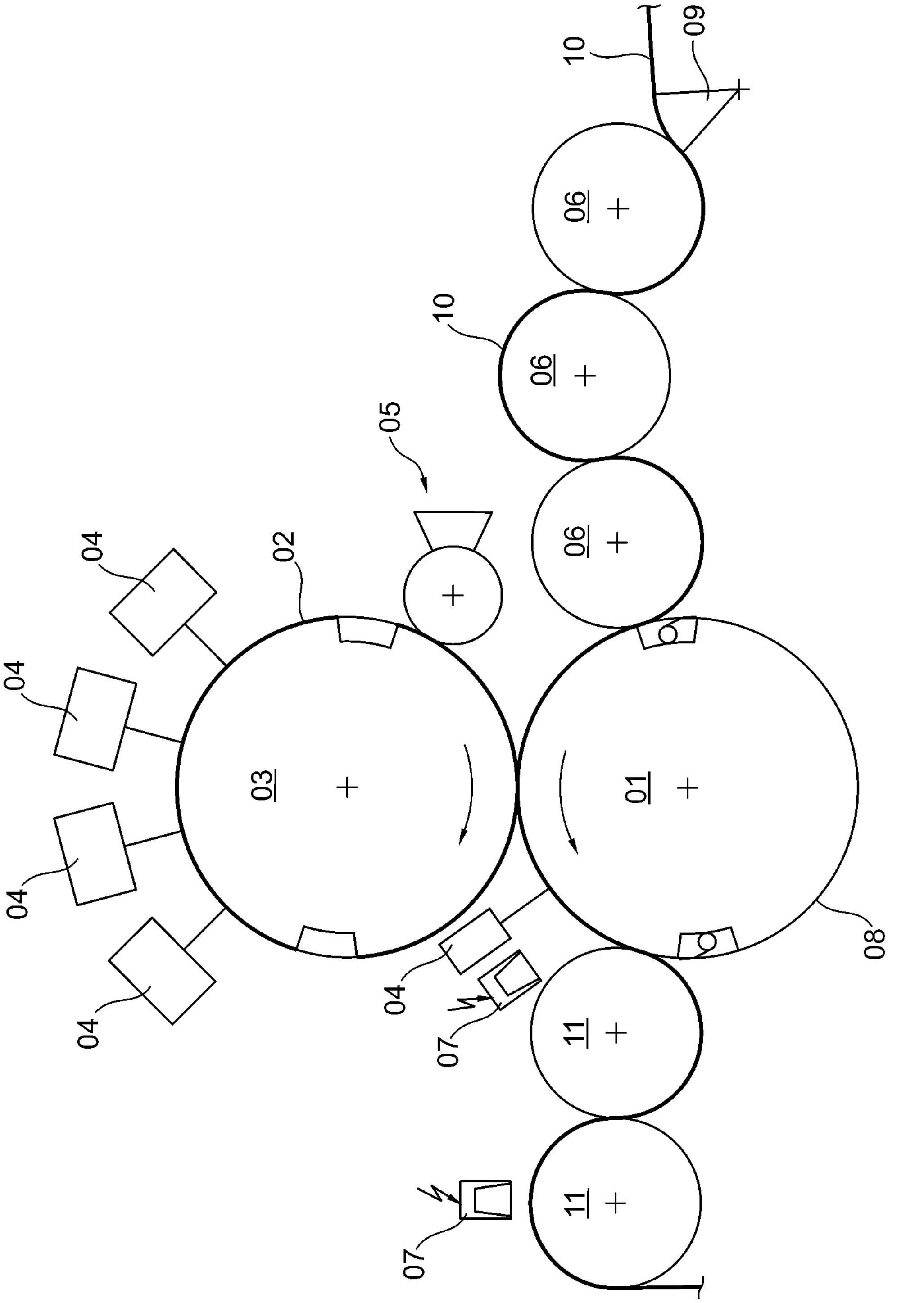
FIG. 3 another schematic illustration of a gravure printing press from FIG. 1, comprising at least one ink jet print head for applying printing fluid and at least one further ink jet print head for applying at least one protective layer.
Figure 4:
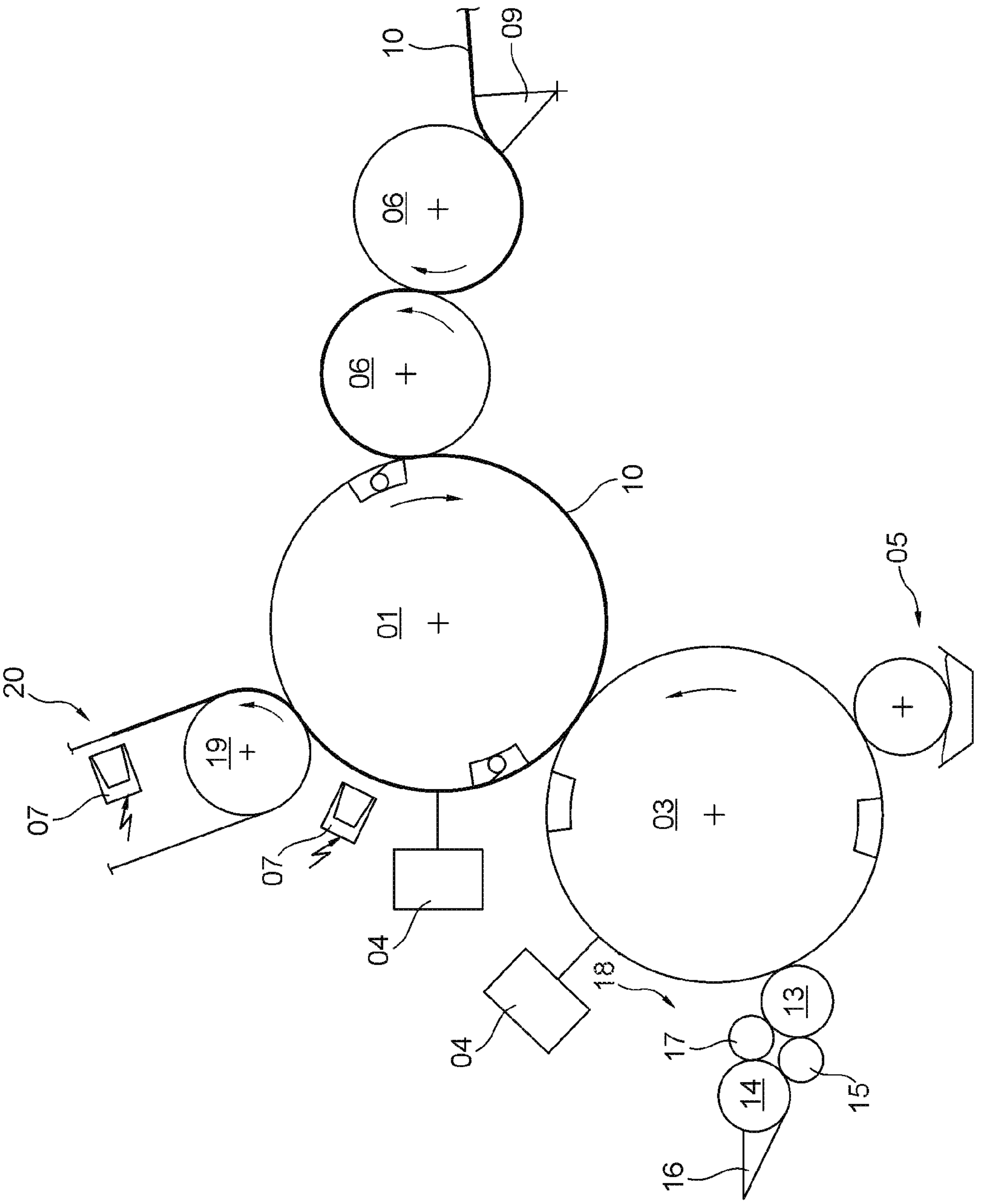
FIG. 4 another schematic illustration of an alternative gravure printing press comprising at least one inking unit and at least one ink jet print head.

A printing press is a machine that applies and/or is capable of applying at least one printing fluid onto at least one substrate 10 in each case, in particular at least one web-format or sheet-format substrate 10. The printing press is configured as a gravure printing press, configured as an intaglio gravure printing press, for example as a steel engraving printing press. The gravure printing press, preferably the intaglio gravure printing press, is preferably configured as a security printing press.

Above and below, a printing fluid preferably refers to inks and further materials that are transferred and/or can be transferred by at least one print head 04 that is in particular configured as an ink jet print head 04 and/or by at least one printing unit 18 onto the at least one substrate 10. The printing fluid preferably creates a preferably visible and/or perceptible, by sensory impressions, and/or machine detectable texture, preferably in finely structured form and/or not merely over a large surface area, on the at least one substrate 10. A printing fluid that is present in a volume of the at least one print head 04 can preferably exit the volume of the relevant print head 04 through an opening, in particular a nozzle, in particular in the form of drops. Inks are preferably solutions or dispersions of at least one colorant in at least one solvent. For example, water and/or organic solvents can be used as solvents. As an alternative or in addition, the printing fluid can be embodied as printing fluid that cures under UV light. Inks are relatively low viscosity printing fluids. Inks contain no binding agent or relatively little binding agent. Colorants can be pigments and/or dyes, wherein pigments are insoluble in the respective solvent, while dyes are soluble in the respective solvent. In particular inks that contain dyes as the colorant preferably do not contain any binding agents.

At least one printing fluid, preferably the at least one printing fluid, is preferably in each case embodied as ink. Preferably, the at least one printing fluid, preferably the at least one printing fluid embodied as ink, has a viscosity of at least 0.02 Pa*s (zero point zero two pascal seconds), preferably of at least 0.05 Pa*s (zero point zero five pascal seconds), more preferably of at least 0.1 Pa*s (zero point one pascal seconds), at a temperature of 25° C. (twenty-five degrees Celsius). Preferably, the at least one printing fluid, preferably the at least one printing fluid embodied as ink, has a viscosity of no more than 20 Pa*s (twenty pascal seconds), preferably of no more than 15 Pa*s (fifteen pascal seconds), more preferably of no more than 10 Pa*s (ten pascal seconds), at a temperature of 25° C. (twenty-five degrees Celsius). For example, the viscosity is determined and/or can be determined by at least one measurement using a single-cylinder rotational viscometer according to DIN EN ISO 2555:2018-09. Preferably, the at least one printing fluid, preferably the at least one printing fluid embodied as ink, is colored. For example in addition or as an alternative, the at least one printing fluid is embodied as a magnetic printing fluid. A magnetic printing fluid preferably comprises at least one pigment that is magnetizable and/or magnetic and/or is alignable and/or aligned by magnetization.

Preferably, the at least one printing fluid, in particular ink, which is used during gravure printing generates a layer having a thickness of at least 1 μm (one micrometer), preferably of at least 3 μm (three micrometers), more preferably of at least 10 μm (ten micrometers), and/or of no more than 70 μm (seventy micrometers), preferably of no more than 60 μm (sixty micrometers), more preferably of no more than 50 μm (fifty micrometers) on a respective substrate 10. For example, when the at least one printing fluid embodied as ink preferably comprises at least one pigment, the at least one printing fluid embodied as ink has a drying duration when exposed to air under standard conditions (SATP conditions at 25° C. and 1.013 bar) of at least 6 hours, preferably of at least 12 hours, to preferably no more than 84 hours, preferably to no more than 72 hours.

The printing press configured as an intaglio gravure printing press comprises at least one forme cylinder 03. The forme cylinder 03 is preferably configured as a plate cylinder 03, more preferably as an intaglio cylinder 03, more preferably as a printing forme cylinder 03. The at least one forme cylinder 03 preferably comprises at least one printing forme 02, for example a printing plate 02, in particular a detachable printing forme 02 configured as a printing plate 02. Preferably, the at least one forme cylinder 03 comprises at least two, more preferably exactly two printing plates 02. The at least one printing plate 02 of the at least one forme cylinder 03 preferably includes at least one engraving, preferably at least two engravings, preferably at least four engravings, and more preferably a multiplicity of engravings. The at least one engraving preferably in each case corresponds to a printing pattern of a printing region to be printed on the at least one substrate 10. The at least one engraving is preferably configured to have a thin width and/or a fine line width and/or exactly maps a respective print image to be printed on the at least one substrate 10. Printing fluid can preferably be transferred from the at least one printing plate 02, which is in particular situated within the at least one engraving, onto the at least one substrate 10 and/or is transferred onto the at least one substrate 10. The at least one forme cylinder 03 is configured to print the at least one substrate 10 with printing fluid. In particular, the at least one forme cylinder 03 is configured to print the at least one substrate 10 with printing fluid under high pressure.

Preferably, the at least one engraving of the at least one forme cylinder 03 is configured to generate at least one haptic sensory impression, preferably at least one relief, on the at least one substrate 10. Each engraving is preferably configured to generate at least one haptic sensory impression. Preferably, the at least one engraving is configured to generate the at least one haptic sensory impression, preferably the at least one relief, during an ink transfer onto the at least one substrate 10. Preferably, the at least one haptic sensory impression, preferably the at least one relief, is created by setting the forme cylinder 03 against the impression cylinder 01 under high pressure.

Above and below, the substrate 10 can be printed by the gravure printing press with a medium, in particular the at least one printing fluid. The at least one substrate 10 is preferably embodied as a web or a sheet and/or comprises at least two multiple-up copies, for example at least four multiple-up copies, preferably at least eight multiple-up copies. Preferably, the at least one substrate 10 printed and/or printable by the gravure printing press, preferably the intaglio gravure printing press, is embodied as a web or a sheet and/or the at least one substrate 10 preferably comprises the at least two multiple-up copies. Above and below, the term multiple-up preferably refers to the number of identical objects that are produced from the same piece of material and/or are arranged on a shared substrate 10, for example a shared sheet and/or a web. A multiple-up is preferably the region of the sheet and/or of the web that is either configured as a product of the gravure printing press, in particular as an intermediate product for producing an end product, and/or, for example, is further processed and/or is configured to be further processable into a desired or required end product. The desired and/or required end product here, which was preferably generated by further processing the respective multiple-up, is preferably a banknote and/or a security. Above and below, the term multiple-up moreover preferably refers to the number of identical objects that are arranged on the at least one printing forme 02 of the at least one forme cylinder 03 and/or that correspond, on the at least one printing forme 02, to the region of the substrate 10 that is configured as a product of the gravure printing press, in particular as an intermediate product for producing an end product, and/or, for example, that is further processed and/or configured to be further processable into the desired or required end product. The at least one printing forme 02 of the at least one forme cylinder 03 preferably includes at least one multiple-up copy, preferably at least two multiple-up copies, preferably at least four multiple-up copies, and more preferably a multiplicity of multiple-up copies.

The gravure printing press comprises at least one impression cylinder 01. The impression cylinder 01 is preferably arranged opposite the at least one forme cylinder 03 with respect to a transport path of substrate 10. Preferably, the at least one impression cylinder 01 has at least one contact region with the at least one forme cylinder 03, which describes the shortest distance between the forme cylinder 03 and the impression cylinder 01 and/or in which the forme cylinder 03 is at least temporarily in contact with the impression cylinder 01 by way of the substrate 10 and/or which forms a printing nip. The impression cylinder 01 is preferably configured as a transport cylinder 01, and more preferably as a printing cylinder 01, which is in particular configured to transport the at least one substrate 10. The impression cylinder 01 is preferably configured to transport the at least one substrate 10 to the at least one printing nip and/or away from the at least one printing nip. The impression cylinder 01 comprises, for example, at least one, for example elastic and/or compressible, supporting surface 08, preferably at least two supporting surfaces 08, which are arranged at the outer cylindrical surface thereof. The at least one impression cylinder 01, in particular the at least one supporting surface 08, and the at least one forme cylinder 03, in particular the at least one printing plate 02, are preferably functionally connected to one another and/or at least temporarily have contact pressure with one another.

The gravure printing press preferably comprises at least one transport means 06; 09 for feeding substrate 10 to the at least one forme cylinder 03 and the at least one impression cylinder 01. The spatial area provided for transporting a substrate 10, which the substrate 10, if such an area is present, at least temporarily occupies, is the transport path. Preferably, the at least one transport means 06; 09 for feeding substrate 10 to the at least one forme cylinder 03 is arranged along the transport path of substrate 10, upstream from the at least one forme cylinder 03. For example, at least one transport means 06 is configured as a transfer cylinder 06. Preferably, at least one transfer cylinder 06, more preferably at least two transfer cylinders 06, for example three transfer cylinders 06 are arranged along the transport path, upstream from the at least one forme cylinder 03. For example, at least one transport means 09 is configured as a feed system 09. For example, the at least one feed system 09 is configured as a rocking gripper 09 and/or a conveyor roller 09.

Preferably, at least one transport means 11 configured as a transfer cylinder 11 is arranged along the transport path, downstream from the at least one forme cylinder 03, which is preferably configured to lead the substrate 10 away from the at least one forme cylinder 03. For example, the at least one transfer cylinder 11 arranged downstream from the forme cylinder 03 comprises at least one gripper and/or is configured to transport the substrate 10 so as to be only supported in an edge region of the respective substrate 10, i.e., not over the entire circumference, on the circumference of the relevant transfer cylinder 11. The gravure printing press preferably comprises at least one transfer cylinder 11, preferably at least two transfer cylinders 11, more preferably exactly two transfer cylinders 11, downstream from the impression cylinder 01.

Preferably in addition or as an alternative, at least one transport means 20, which is configured to forward and/or transport the at least one substrate 10 and which is configured as a conveyor system 20 and/or belt system 20, is arranged along the transport path of the at least one substrate 10, downstream from the at least one printing nip, this being the contact region of the forme cylinder 03 and the impression cylinder 01. The at least one transport means 20 is preferably arranged at the at least one impression cylinder 01, and/or the at least one transport means 20 is preferably configured to further transport the at least one substrate 10 from the impression cylinder 01. The at least one transport means 20 preferably comprises at least one roller 19, which is configured to drive the transport means 20. For example, the at least one dryer 07, preferably at least one of the dryers 07, is arranged at the at least one conveyor system 20, and preferably is additionally directed at the printed side of the substrate 10.

The intaglio gravure printing press comprises the at least one print head 04, preferably the at least one print head 04 configured as an ink jet print head 04. The at least one print head 04, which is preferably configured as an ink jet print head 04, by way of which preferably the at least one engraving can be inked and/or is inked with at least one printing fluid, is preferably arranged at the circumference of the at least one forme cylinder 03. Preferably, the at least one print head 04, in particular the at least one ink jet print head 04, is preferably configured as a non-impact print head 04. The at least one ink jet print head 04 is preferably arranged in at least one nozzle bar, which is preferably in each case arranged parallel to an axis of rotation of the at least one forme cylinder 03. The at least one nozzle bar preferably comprises at least one ink jet print head 04, and in particular at least two ink jet print heads 04. Preferably, at least two ink jet print heads 04, more preferably at least four ink jet print heads 04, are arranged at the at least one forme cylinder 03, wherein the at least two ink jet print heads 04 are arranged one behind the other at the at least one forme cylinder 03, along a direction of rotation of the at least one forme cylinder 03, in particular orthogonally to the axis of rotation of the forme cylinder 03. Preferably, at least two nozzle bars, more preferably at least four nozzle bars, each comprising at least one print head 04 that is preferably configured as an ink jet print head 04, preferably at least two print heads 04 that are preferably configured as ink jet print heads 04, more preferably at least four print heads 04 that are preferably configured as ink jet print heads 04, are arranged one behind the other at the at least one forme cylinder 03, along the direction of rotation of the at least one forme cylinder 03. The at least one print head 04, in particular the at least one non-impact print head 04, is configured to apply at least one printing fluid, preferably without contact, onto at least one surface of the at least one substrate 10, which faces at least one nozzle and/or opening of the print head 04.

For example, all print heads 04 of a nozzle bar, which are preferably configured as ink jet print heads 04, comprise the same printing fluid. In a preferred embodiment, the at least one print head 04 of a first nozzle bar, which is preferably configured as an ink jet print head 04, comprises a different printing fluid, in particular a printing fluid of a different color, in relation to at least one print head 04 of at least one second nozzle bar, which is preferably configured as an ink jet print head 04. For example, the at least two nozzle bars comprise printing fluids that are different from one another, in particular printing fluids of differing colors. As an alternative, the at least one ink jet print head 04 of a first nozzle bar comprises an identical printing fluid, in particular a printing fluid of an identical color, in relation to at least one ink jet print head 04 of at least one second nozzle bar.

For example, the at least one print head 04, in particular the ink jet print head 04, arranged at the at least one forme cylinder 03 is configured to comprise at least one printing fluid embodied as ink. Preferably, a print head 04, in particular an ink jet print head 04 and/or a non-impact print head 04, which comprises at least one ink, in particular a colored ink, is configured as a color print head. The at least one print head 04 configured as a color print head preferably comprises an ink of the color cyan and/or magenta and/or yellow and/or black. For example as an alternative, the at least one print head 04 configured as a color print head comprises a special color.

The printing press comprises at least one printing unit. In the case of the intaglio gravure printing press, the at least one printing unit is configured as a gravure printing unit, preferably as an intaglio gravure printing unit. The at least one printing unit configured as a gravure printing unit, preferably an intaglio gravure printing unit, comprises the at least one forme cylinder 03 and the at least one impression cylinder 01. More preferably, the at least one gravure printing unit of the gravure printing press, preferably the intaglio gravure printing unit, comprises at least the at least one forme cylinder 03 and the at least one print head 04, in particular the ink jet print head 04, and the at least one impression cylinder 01.

Preferably, at least one dryer 07 is arranged along the transport path of substrate 10, downstream from the at least one forme cylinder 03, in particular downstream from the at least one contact region of the at least one forme cylinder 03 with the at least one impression cylinder 01, and/or downstream from the printing nip. The at least one dryer 07 is preferably arranged along a transport path of substrate 10, downstream from the at least one forme cylinder 03 and/or prior to a deposition of the at least one substrate 10 in at least one delivery pile. The at least one dryer 07 is preferably arranged outside the transport path and directed at the transport path. In particular, the at least one dryer 07 is directed at the side of the at least one substrate 10 which is printed with the at least one printing fluid by the at least one forme cylinder 03. The at least one dryer 07 is preferably configured as a radiation dryer and/or an electron beam dryer and/or an ultraviolet radiation dryer (UV dryer) and/or an infrared radiation dryer (IR dryer) and/or a near infrared radiation dryer (NIR dryer). The at least one dryer 07 preferably includes electron radiation and/or ultraviolet radiation (UV radiation) and/or infrared radiation (IR radiation) and/or near infrared radiation (NIR radiation) as the form of radiation. Near infrared radiation describes short-wave infrared radiation with wavelengths of at least 760 nm (seven hundred sixty nanometers) to no more than 3,000 nm (three thousand nanometers), preferably no more than 2,500 nm (two thousand five hundred nanometers), more preferably no more than 1,400 nm (one thousand four hundred nanometers). For example, at least two dryers 07 are arranged downstream from the at least one forme cylinder 03, in particular downstream from the at least one contact region of the at least one forme cylinder 03 with the at least one impression cylinder 01. Preferably, at least one of the at least two dryers 07 is arranged at the at least one transfer cylinder 11, preferably at the second transfer cylinder 11, along the transport path, downstream from the at least one forme cylinder 03. The at least two dryers 07 are preferably directed at the same side of the at least one substrate 10. For example, the at least two dryers 07 have identical forms of radiation, in particular electron radiation and/or UV radiation and/or infrared radiation and/or NIR radiation. As an alternative, the at least two dryers 07 have forms of radiation that differ from one another. In particular, the at least one dryer 07 is configured to at least partially dry the at least one printing fluid on the respective substrate 10. Preferably, at least the printing fluid of the at least one print head 04 is dried by the at least one dryer 07 configured as a radiation dryer and/or an electron beam dryer and/or a UV dryer and/or an infrared radiation dryer and/or a NIR dryer.

Preferably, at least one cleaning device 05, which is preferably configured as a wiping device 05, is arranged at the at least one forme cylinder 03. Preferably, the at least one cleaning device 05, which is in particular configured as a wiping device 05, is arranged along the direction of rotation of the at least one forme cylinder 03, downstream from the at least one ink jet print head 04 and upstream from the contact region of the at least one forme cylinder 03 with the at least one impression cylinder 01. The at least one cleaning device 05 that is preferably configured as a wiping device 05 preferably comprises at least one wiping cylinder. The at least one cleaning device 05 is preferably configured with at least one wiping cylinder. The at least one wiping cylinder is preferably set against the at least one forme cylinder 03. For example, the at least one wiping cylinder, during production operation, has a direction of rotation that is opposite that of the at least one assigned forme cylinder 03, wherein the circumferential speed of the wiping cylinder, for example, is higher than the circumferential speed of the relevant forme cylinder 03. For example as an alternative, the at least one wiping cylinder, during production operation, has the same direction of rotation as the at least one assigned forme cylinder 03. The at least one cleaning device 05, which is in particular configured as a wiping device 05, is preferably configured to remove printing fluid from the at least one printing plate 02, in particular the printing fluid that is situated outside the at least one engraving on the at least one printing plate 02. The at least one wiping cylinder is preferably configured to dip into cleaning liquid, preferably also referred to as washing fluid. Preferably in addition or as an alternative, the at least one wiping device 05 comprises at least one nozzle that sprays cleaning liquid onto the wiping cylinder. Preferably in addition or as an alternative, the at least one wiping device 05 is configured to clean the at least one wiping cylinder, preferably with every revolution of the wiping cylinder. The at least one wiping cylinder is preferably in contact, preferably in dipping contact, with a washing fluid supply. Preferably, the printing fluid taken off the forme cylinder 03 is removed from the outer cylindrical surface of the wiping cylinder by the cleaning liquid. For this purpose, the wiping cylinder can dip into a washing fluid and, preferably additionally or alternatively, be wiped off by suitable devices, such as doctor blades and/or brushes. The washing fluid is stored, for example, in a fluid receptacle, e.g., a washing tank, into which the wiping cylinder dips partially so as to be cleaned.

At least one inking unit 18 and/or at least one ink collecting cylinder 12, to which at least one inking unit 18, preferably the at least one inking unit 18, is assigned, are arranged at the at least one forme cylinder 03. Preferably, the at least one inking unit 18 and/or the at least one ink collecting cylinder 12 are arranged along the direction of rotation of the at least one forme cylinder 03, upstream from the contact region of the at least one forme cylinder 03 with the at least one impression cylinder 01. The at least one inking unit 18 preferably comprises at least one ink fountain 16 comprising at least one roller 14, configured as a duct roller 14, and at least one roller 15, configured as an ink application roller 15. The at least one inking unit 18 furthermore preferably comprises at least one roller 13, configured as a chablon roller 13, and/or at least one roller 17, configured as a distribution roller 17. Preferably, at least one printing fluid, which is preferably embodied as ink, in particular at least one colored printing fluid, is transferred from the at least one ink fountain 16 via the at least one roller 13; 14; 15; 17 onto the at least one ink collecting cylinder 12. The at least one printing fluid of the at least one inking unit 18 and/or ink collecting cylinder 12 is preferably embodied as ink, preferably as gravure printing ink. For example, the at least one printing fluid of the at least one inking unit 18 and/or of the at least one ink collecting cylinder 12 has at least one color, for example yellow and/or green and/or red and/or blue and/or black and/or at least one special color.

Preferably, at least two inking units 18, for example at least four inking units 18, preferably at least six inking units 18, are arranged at the at least one ink collecting cylinder 12. The at least one ink collecting cylinder 12 preferably comprises at least the respective printing fluid of the at least one inking unit 18, preferably of the at least two inking units 18. In particular, the at least two printing fluids of the at least two inking units 18 can be arranged and/or are arranged one behind the other, in particular in the circumferential direction of the ink collecting cylinder 12, and/or, preferably additionally, next to one another, orthogonally to the circumferential direction, on the at least one ink collecting cylinder 12. The at least one gravure printing unit is preferably configured as a printing unit of an indirect gravure printing process. In particular the at least one ink collecting cylinder 12 is arranged between the at least one inking unit 18 and the at least one forme cylinder 03. In this way, a preferably indirect ink transfer takes place from the at least one inking unit 18 onto the at least one forme cylinder 03.

Preferably, the at least one forme cylinder 03 is at least partially inked by the at least one ink collecting cylinder 12 with the at least one printing fluid, in particular the at least one printing fluid that is in particular embodied as ink, more preferably the at least one colored printing fluid, in particular in the region of the at least one engraving and/or at least in the at least one engraving, more preferably exclusively in the at least one engraving. For example as an alternative or in addition, the at least one forme cylinder 03 is at least partially inked by the at least one inking unit 18 with the at least one printing fluid, in particular the at least one printing fluid that is in particular embodied as ink, more preferably the at least one colored printing fluid, in particular in the region of the at least one engraving and/or at least in the at least one engraving, more preferably exclusively in the at least one engraving. The at least one inking unit 18 and/or the at least one ink collecting cylinder 12 preferably ink the at least one engraving of the at least one forme cylinder 03 with at least one printing fluid embodied as ink. Preferably, the at least one cleaning device 05, which at least partially removes excess printing fluid inking the forme cylinder 03 outside the at least one engraving, is arranged at the at least one forme cylinder 03, along the direction of rotation of the at least one forme cylinder 03, downstream from the at least one ink collecting cylinder 12. Preferably, the at least one cleaning device 05 is arranged at the at least one forme cylinder 03 along the direction of rotation of the at least one forme cylinder 03, downstream from the at least one inking unit 18 and/or downstream from the at least one ink collecting cylinder 12. The at least one wiping device 05 is preferably arranged along the direction of rotation of the forme cylinder 03, downstream from the at least one inking unit 18 and/or ink collecting cylinder 12 and/or downstream from the at least one print head 04. Preferably, the at least one cleaning device 05, which is preferably configured as a wiping device 05, is arranged at the at least one forme cylinder 03 along the direction of rotation of the at least one forme cylinder 03, downstream from the at least one print head 04 and downstream from the at least one inking unit 18 and/or ink collecting cylinder 12. Preferably, the at least one inking unit 18 and/or the at least one ink collecting cylinder 12 are arranged along the direction of rotation of the at least one forme cylinder 03, between the at least one print head 04 and the at least one cleaning device 05, which is preferably configured as a wiping device 05. Preferably, the at least one cleaning device 05, which is preferably configured as a wiping device 05, is arranged along the direction of rotation of the at least one forme cylinder 03, upstream from the contact region of the at least one forme cylinder 03 with the at least one impression cylinder 01 which is configured as a printing nip.

For example, the at least one print head 04, in particular the ink jet print head 04 and/or non-impact print head 04, acts according to the drop-on-demand principle, wherein droplets of printing fluid are produced in a targeted manner when needed. For example as an alternative, the at least one print head 04, in particular the ink jet print head 04 and/or non-impact print head 04, acts as a continuous print head 04, wherein droplets of printing fluid are continuously produced and deflected as needed during their travel.

The gravure printing press, in particular the at least one gravure printing unit, comprises the at least one print head 04 and/or ink jet print head 04 and/or non-impact print head 04, which comprises at least one printing fluid that differs from the printing fluid embodied as at least one ink. In a preferred embodiment, this at least one print head 04 and/or ink jet print head 04 is configured as a coating print head. The at least one print head 04 preferably comprises at least one printing fluid, which is configured to be transparent. Preferably in addition or as an alternative, the at least one printing fluid of the at least one print head 04, preferably of the at least one coating print head, is embodied as varnish and/or as UV varnish, for example as clear varnish. Preferably, the at least one printing fluid of the at least one print head 04, preferably of the at least one coating print head, forms at least one protective layer and/or at least one protective film on the at least one substrate 10 that is printed and/or can be printed by the intaglio gravure printing press. In particular, the intaglio printing press comprises at least one nozzle bar, which comprises at least two print heads 04, preferably a plurality of print heads 04, the print heads 04 preferably being arranged orthogonally to the transport path and/or at least partially next to one another.

For example, in at least one embodiment, the at least one print head 04 applies at least one numbering and/or at least one symbol and/or at least one marking to the at least one substrate 10.

Preferably, the at least one print head 04, preferably at least the at least one coating print head, is configured to apply printing fluid as a thin layer, preferably as a thin transparent layer, onto the at least one substrate 10. Preferably, the at least one printing fluid of the at least one print head 04, which preferably differs from the at least one printing fluid embodied as ink, forms at least one protective layer and/or at least one protective film on the at least one substrate 10. Preferably, the respective protective layer and/or the respective protective film are applied at least locally onto the surface of the substrate 10, in particular at the at least one position at which the relevant substrate 10 includes at least one printing fluid preferably embodied as ink. Preferably, the at least one forme cylinder 03 is configured to transfer at least one printing fluid embodied as ink onto at least one substrate 10. Preferably, the at least one print head 04 comprises the at least one print fluid, which the at least one print head 04 is configured to directly or indirectly transfer onto the at least one substrate 10 at the position of the at least one printing fluid embodied as ink. For example, the at least one print head 04 generates a planar layer, which at least partially, preferably completely, covers the surface of the substrate 10. For example, at least those regions of the substrate 10 which have a layer thickness of printing fluid embodied as ink of at least 5 μm (five micrometers), preferably of at least 15 μm (fifteen micrometers), more preferably of at least 25 μm (twenty-five micrometers), are in particular additionally inked and/or coated with the at least one printing fluid of the at least one print head 04.

Preferably, the intaglio gravure printing press comprises at least one print head 04 that is arranged at the at least one forme cylinder 03. Preferably in addition or as an alternative, the intaglio gravure printing press comprises at least one print head 04 that is arranged at the at least one impression cylinder 01. The gravure printing press comprises the at least one print head 04, which is arranged at the at least one forme cylinder 03 or at the at least one impression cylinder 01. Preferably, the relevant at least one print head 04 is arranged at the at least one forme cylinder 03 in such a way that the at least one nozzle and/or opening of the print head 04 is directed at the at least one forme cylinder 03 and/or that printing fluid is configured to exit the print head 04 in the direction of the surface of the at least one forme cylinder 03. Preferably as an alternative, the relevant at least one print head 04 is arranged at the at least one impression cylinder 01 in such a way that the at least one nozzle and/or opening of the print head 04 is directed at the at least one impression cylinder 01 and/or that printing fluid is configured to exit the print head 04 in the direction of the surface of the at least one impression cylinder 01.

Preferably, the at least one print head 04, preferably at least one print head 04 of the print heads 04, preferably at least one coating print head and/or at least one color print head, is arranged at the at least one forme cylinder 03. Preferably, the at least one print head 04, preferably the at least one coating print head, is arranged along the direction of rotation of the forme cylinder 03 as a first print head 04, downstream from the at least one printing nip. The at least one print head 04 is preferably the first print head 04, along the direction of rotation of the forme cylinder 03, which is configured to ink the at least one engraving with printing fluid. The at least one print head 04 is preferably configured to ink the at least one engraving prior to it being inked with the at least one printing fluid embodied as ink by way of the at least one printing fluid of the respective print head 04.

The at least one ink collecting cylinder 12, including the at least one inking unit 18, and/or the at least one inking unit 18 are preferably arranged along the direction of rotation of the forme cylinder 03, downstream from the at least one print head 04. The at least one inking unit 18 preferably comprises at least one printing fluid, which is preferably embodied as ink. The at least one inking unit 18 and/or the at least one ink collecting cylinder 12 are preferably configured to ink the at least one engraving of the at least one forme cylinder 03 with at least one printing fluid that is preferably embodied as ink. The at least one print head 04 is preferably arranged along the direction of rotation of the at least one forme cylinder 03, downstream from the contact region, and the at least one inking unit 18 and/or the at least one ink collecting cylinder 12 are preferably arranged downstream from the at least one print head 04.

Preferably in addition or as an alternative, at least one further print head 04, for example at least four further print heads 04, which preferably comprise a printing fluid that is preferably embodied as ink and/or which are preferably configured as color print heads, is arranged at the at least one forme cylinder 03 along its direction of rotation, downstream from the at least one print head 04, which preferably comprises the printing fluid that is preferably different from ink and/or which is preferably configured as a coating print head. Inside the at least one engraving, the at least two printing fluids, with which the at least one forme cylinder 03 was preferably consecutively inked, are preferably arranged separately from one another, and more preferably layered on top of one another. Due to the at least two printing fluids being transferred from the at least one engraving onto the at least one substrate 10, the at least one printing fluid, which is preferably embodied as ink, is preferably arranged beneath the at least one printing fluid, which is preferably different from ink, of the at least one print head 04, preferably of the coating print head, on the substrate 10. In particular, at least one protective layer and/or one protective film is thus generated on the substrate 10 over the at least one printing fluid, which is in particular embodied as ink, for example in a locally delimited region or in a planar manner, by the at least one printing fluid of the at least one print head 04. Preferably in addition, the printing fluid in the at least one engraving, which is applied by the at least one print head 04, is configured to act as a separating agent between the inner surface of the engraving and the printing fluid, which is preferably applied by the at least one ink collecting cylinder 12, including the at least one inking unit 18, and/or by the at least one inking unit 18 and/or by the at least one further print head 04, preferably the color ink head. Preferably, in this way the at least one printing fluid, in particular by way of which the at least one engraving was inked by the at least one ink collecting cylinder 12, including the at least one inking unit 18, and/or by the at least one further print head 04, can be transferred, preferably completely, and/or is transferred, preferably completely, from the at least one engraving onto the at least one substrate 10.

Preferably in addition or as an alternative, the at least one print head 04, preferably the at least one coating print head, is arranged at the at least one impression cylinder 01 along the transport path of the at least one substrate 10, downstream from the at least one printing nip between the at least one forme cylinder 03 and the at least one impression cylinder 01. This print head 04 is preferably configured to ink at least those points on the substrate 10 with printing fluid to which printing fluid was already applied at the at least one printing nip. In particular, at least one protective layer and/or one protective film is thus generated on the substrate 10 over the at least one printing fluid, which is in particular embodied as ink, for example in a locally delimited region or in a planar manner, by the at least one printing fluid of the at least one print head 04.

For example, the gravure printing press only comprises the at least one print head 04, which preferably comprises a printing fluid that is different from ink, at one of the two positions, that is, either arranged at the at least one impression cylinder 01 or at the at least one forme cylinder 03. As an alternative, the gravure printing press, for example, comprises print heads 04 at at least two positions within the gravure printing press, preferably at least one print head 04 arranged at the at least one impression cylinder 01 and at least one print head 04 arranged at the at least one forme cylinder 03. Preferably, the intaglio printing press comprises at least two print heads 04, wherein at least one print head 04 is arranged at the at least one impression cylinder 01, and wherein at least one print head 04 is arranged at the at least one forme cylinder 03.

In particular, at least one delivery of the at least one substrate 10 is arranged downstream from the at least one gravure printing unit. Preferably printed substrate 10 is preferably collected in the at least one delivery at at least one collecting position, for example in the form of at least one delivery pile in the case of sheet-format substrate 10 or in the form of at least one roll in the case of web-format substrate 10. In particular, the at least one delivery comprises at least one delivery pile or at least one roll. Preferably, the at least one delivery pile has a pile height of at least 100 substrates 10, preferably of at least 300 substrates 10, more preferably of at least 500 substrates 10, and more preferably of at least 800 substrates 10.

The at least one dryer 07 is preferably arranged along the transport path of the at least one substrate 10, downstream from the at least one forme cylinder 03 and/or upstream from the at least one collecting position of the at least one substrate 10 of the at least one delivery pile. Preferably, the at least one dryer 07, preferably at least one of the dryers 07, is arranged upstream from the at least one delivery. For example in addition or as an alternative, the at least one dryer 07, preferably at least one of the dryers 07, in the at least one delivery, however, is arranged upstream from the at least one collecting position of the at least one substrate 10. At least one of the dryers 07 is preferably configured as a UV dryer.

For example, the at least two printing fluids that differ from one another, in particular the at least one printing fluid that is preferably embodied as ink and the at least one printing fluid that is preferably different from ink, have drying behaviors that differ from one another. Preferably, at least the printing fluid of the at least one print head 04, preferably the printing fluid that is different from ink, is configured to cure under ultraviolet radiation (UV radiation) and/or to dry and/or to be dryable by way of UV radiation. For example, the at least one printing fluid of the at least one inking unit 18 is configured to dry and/or to be dryable by way of thermal radiation, for example infrared radiation and/or heat, or UV radiation or electron radiation. At least the printing fluid that was discharged by the at least one print head 04 and/or that the at least one print head 04 comprises, preferably at least the printing fluid that is different from ink, is preferably dried prior to the substrate 10 arriving in the delivery, in particular in the collecting position, and/or prior to a sheet-format substrate 10 being deposited on a delivery pile or prior to a web-format substrate 10 being rolled up in the delivery.

The at least one printing fluid is applied onto the at least one substrate 10. The at least one printing fluid embodied as ink is applied onto the at least one substrate 10. The at least one printing fluid that differs from the printing fluid embodied as at least one ink is indirectly or directly applied onto the at least one substrate 10 by means of the at least one print head 04.

Above and below, an indirect application of printing fluid onto the at least one substrate 10 preferably describes an application by way of an intermediate step that represents a transfer of printing fluid. At least one component of the gravure printing press, preferably at least the at least one forme cylinder 03 and/or, for example, the at least one ink collecting cylinder 12, receives the printing fluid from a printing fluid-ejecting and/or printing fluid-dispensing component of the gravure printing press, preferably the at least one inking unit 18 and/or preferably the at least one print head 04, before the at least one printing fluid is transferred onto the at least one substrate 10.

Above and below, a direct application of printing fluid onto the at least one substrate 10 preferably describes an application of printing fluid by the at least one printing fluid-ejecting and/or printing fluid-dispensing component, preferably the at least one inking unit 18 and/or preferably the at least one print head 04, directly onto the at least one substrate 10, preferably without at least one intermediate step representing a transfer of printing fluid.

Preferably in addition, the at least one print head 04 indirectly applies its printing fluid onto the at least one substrate 10 by means of the at least one forme cylinder 03 being inked by the at least one print head 04.

Preferably in addition, the at least one print head 04 inks the at least one engraving with the printing fluid of the print head 04 prior to the at least one engraving being inked with a printing fluid embodied as ink.

Preferably in addition or as an alternative, the at least one print head 04 directly applies its printing fluid onto the at least one substrate 10 at the at least one impression cylinder 01, along the transport path of the at least one substrate 10, downstream from the at least one printing nip between the at least one forme cylinder 03 and the at least one impression cylinder 01.

Preferably in addition or as an alternative, at least the printing fluid of the print head 04 is dried along the transport path of substrate 10, downstream from the at least one forme cylinder 03 and/or upstream from the at least one collecting position of substrate 10 of the at least one delivery.

Preferably in addition or as an alternative, the at least one forme cylinder 03, preferably at least the surface of the at least one forme cylinder 03, is cleaned by the at least one cleaning device 05, which is preferably configured as a wiping device 05. The at least one wiping cylinder preferably dips into cleaning liquid and/or cleaning liquid is preferably sprayed onto the at least one wiping cylinder and/or the at least one wiping device 05 preferably cleans the at least one wiping cylinder.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. An intaglio gravure printing press comprising at least one gravure printing unit, the at least one gravure printing unit comprising at least one forme cylinder (03), at least one impression cylinder (01), and at least one inking unit (18), wherein:

the at least one inking unit (18) is arranged at the at least one forme cylinder (03) and provides ink to the at least one forme cylinder (03), or at least one ink collecting cylinder (12) is arranged at the at least one forme cylinder (03) and the at least one inking unit (18) is arranged at the at least one ink collecting cylinder (12), the at least one ink collecting cylinder (12) providing ink from the inking unit (18) to the at least one forme cylinder (03), the intaglio gravure printing press further comprising at least one print head (04), which is arranged at the at least one forme cylinder (03), and which is positioned with respect to the at least one forme cylinder (03) to apply a protective fluid into at least one engraving on the at least one forme cylinder (03) prior to the ink being applied into the at least one engraving on the at least one forme cylinder (03) to enable the at least one forme cylinder (03) to deposit concurrently both the ink and the protective fluid during printing onto at least one substrate (10), the protective fluid forming a protective layer and/or protective film on the ink deposited onto the at least one substrate (10), the protective fluid configured to at least one of dry, be dried, cure, or be cured more quickly than the ink, the intaglio gravure printing press further comprising at least one wiping device (05) arranged at the at least one forme cylinder (03), wherein the at least one wiping device (05) is arranged along the direction of rotation of the at least one forme cylinder (03), downstream from the at least one print head (04), and upstream from a contact region of the at least one forme cylinder (03) with the at least one impression cylinder (01), and the intaglio gravure printing press further comprising at least one dryer (07) arranged along a transport path of the at least one substrate (10), downstream from the at least one forme cylinder (03) and upstream from at least one collecting position of the at least one substrate (10), the at least one dryer (07) configured to dry and/or cure, at least in part, the protective fluid.

2. The intaglio gravure printing press according to claim 1, characterized in that at least one further print head (04) is arranged at the at least one forme cylinder (03) along the direction of rotation of the at least one forme cylinder (03), downstream from the at least one print head (04).

3. The intaglio gravure printing press according to claim 1, characterized in that the protective fluid is configured to be transparent, and/or that the protective fluid is embodied as varnish and/or as UV varnish.

4. The intaglio gravure printing press according to claim 1, characterized in that the at least one wiping device (05) is arranged along the direction of rotation of the at least one forme cylinder (03), downstream from the at least one inking unit (18) or the at least one ink collecting cylinder (12).

5. The intaglio gravure printing press according to claim 1, characterized in that the intaglio gravure printing press comprises at least two print heads (04), including the at least one print head (04) arranged at the at least one forme cylinder (03), and at least one other print head (04) arranged at the at least one impression cylinder (01).

6. The intaglio gravure printing press according to claim 1, characterized in that the at least one substrate (10) having the ink and the protective fluid printed thereon is delivered onto a delivery pile at a delivery, or is rolled up at the delivery, and that the protective fluid is configured to be dry and/or cured prior to the at least one substrate (10) arriving at the delivery, and that the ink is configured to not be dry and/or cured prior to the at least one substrate (10) arriving at the delivery.

7. The intaglio gravure printing press according to claim 1, characterized in that the protective fluid is configured to serve, at least in part, as a separating agent between the at least one engraving and the ink, and/or that, following applying the ink to the at least one engraving, the ink is layered, at least in part, on the protective fluid inside the at least one engraving.

8. A method for applying at ink and a protective fluid onto at least one substrate (10) by use of at least one intaglio gravure printing press comprising at least one gravure printing unit, the at least one gravure printing unit comprising at least one forme cylinder (03) and at least one impression cylinder (01), the at least one forme cylinder (03) comprising at least one printing plate (02) including at least one engraving, the at least one intaglio gravure printing press further comprising at least one inking unit (18), wherein:

the at least one inking unit (18) applies the ink into the at least one engraving of the at least one forme cylinder (03), or at least one ink collecting cylinder (12) having the at least one inking unit (18) arranged thereat, applies the ink into the at least one engraving of the at least one forme cylinder (03), the intaglio gravure printing press further comprising at least one print head (04) that is positioned to apply the protective fluid into the at least one engraving on the at least one forme cylinder (03), the method comprising:

applying, by the at least one print head (04), the protective fluid into the at least one engraving prior to applying the ink into the at least one engraving, applying, by the at least one ink collecting cylinder (12) or the at least one inking unit (18), the ink into the at least one engraving having the protective fluid therein, during printing, depositing concurrently the ink and the protective fluid from the at least one engraving onto the at least one substrate (10), the protective fluid forming at least one protective layer and/or at least one protective film on the ink deposited on the at least one substrate (10), and subsequent to the printing, drying and/or curing, by at least one dryer (07), the protective fluid at least in part, the protective fluid configured to at least one of dry, be dried, cure, or be cured more quickly than the ink.

9. The method according to claim 8, characterized in that the protective fluid is configured to be transparent, and/or that the protective fluid is embodied as varnish and/or as UV varnish.

10. The method according to claim 8, further comprising wiping the at least one forme cylinder (03) by at least one wiping device (05), characterized in that the at least one wiping device (05) is arranged along a direction of rotation of the at least one forme cylinder (03), downstream from the at least one inking unit (18) and/or the at least one ink collecting cylinder (12), and downstream from the at least one print head (04), and/or that the at least one wiping device (05) is arranged along the direction of rotation of the at least one forme cylinder (03), upstream from a contact region of the at least one forme cylinder (03) with the at least one impression cylinder (01).

11. The method according to claim 8, characterized in that the intaglio gravure printing press comprises at least two print heads (04), including the at least one print head (04) arranged at the at least one forme cylinder (03), and at least one other print head (04) arranged at the at least one impression cylinder (01).

12. The method according to claim 8, characterized in that the protective fluid applied by the at least one print head (04) is dried and/or cured along a transport path of the at least one substrate (10), downstream from the at least one forme cylinder (03) and/or upstream from at least one collecting position of the at least one substrate (10) of at least one delivery.

13. The method according to claim 8, characterized in that the at least one substrate (10) having the ink and the protective fluid printed thereon is delivered onto a delivery pile at a delivery, or is rolled up at the delivery, and that the protective fluid is configured to be dry and/or cured prior to the at least one substrate (10) arriving at the delivery, and that the ink is configured to not be dry and/or cured prior to the at least one substrate (10) arriving at the delivery.

14. The method according to claim 8, characterized in that the protective fluid serves, at least in part, as a separating agent between the at least one engraving and the ink, and/or that, following applying the ink to the at least one engraving, the ink is layered, at least in part, on the protective fluid inside the at least one engraving.

15. An intaglio gravure printing press comprising at least one gravure printing unit, the at least one gravure printing unit comprising at least one forme cylinder (03), at least one impression cylinder (01), and at least one inking unit (18), wherein:

the at least one inking unit (18) is arranged at the at least one forme cylinder (03) and provides a first printing fluid to the at least one forme cylinder (03), or at least one ink collecting cylinder (12) is arranged at the at least one forme cylinder (03) and the at least one inking unit (18) is arranged at the at least one ink collecting cylinder (12), the at least one ink collecting cylinder (12) providing the first printing fluid from the inking unit (18) to the at least one forme cylinder (03), the intaglio gravure printing press further comprising at least one print head (04), which is arranged at the at least one forme cylinder (03), and which is positioned with respect to the at least one forme cylinder (03) to apply a second printing fluid into at least one engraving on the at least one forme cylinder (03) prior to the first printing fluid being applied into the at least one engraving on the at least one forme cylinder (03) to enable the at least one forme cylinder (03) to deposit concurrently both the first printing fluid and the second printing fluid during printing onto at least one substrate (10), the second printing fluid forming, at least in part, a layer and/or film on the first printing fluid deposited onto the at least one substrate (10), the second printing fluid having a drying and/or curing behavior that is different from a drying and/or curing behavior of the first printing fluid.

16. The intaglio gravure printing press according to claim 15, characterized in that the at least one substrate (10) having the first printing fluid and the second printing fluid printed thereon is delivered onto a delivery pile at a delivery, or is rolled up at the delivery, and that the second printing fluid is configured to be dry and/or cured prior to the at least one substrate (10) arriving at the delivery, and that the first printing fluid is configured to not be dry and/or cured prior to the at least one substrate (10) arriving at the delivery.

17. The intaglio gravure printing press according to claim 15, further comprising at least one wiping device (05) arranged at the at least one forme cylinder (03), wherein the at least one wiping device (05) is arranged along a direction of rotation of the at least one forme cylinder (03), downstream from the at least one print head (04), and upstream from a contact region of the at least one forme cylinder (03) with the at least one impression cylinder (01).

18. A method for applying a first printing fluid and a second printing fluid onto at least one substrate (10) by use of at least one intaglio gravure printing press comprising at least one gravure printing unit, the at least one gravure printing unit comprising at least one forme cylinder (03) and at least one impression cylinder (01), the at least one forme cylinder (03) comprising at least one printing plate (02) including at least one engraving, the at least one intaglio gravure printing press further comprising at least one inking unit (18), wherein:

the at least one inking unit (18) applies the first printing fluid into the at least one engraving of the at least one forme cylinder (03), or at least one ink collecting cylinder (12) having the at least one inking unit (18) arranged thereat, applies the first printing fluid into the at least one engraving of the at least one forme cylinder (03), the intaglio gravure printing press further comprising at least one print head (04) that is positioned to apply the second printing fluid into the at least one engraving on the at least one forme cylinder (03), the method comprising:

applying, by the at least one print head (04), the second printing fluid into the at least one engraving prior to applying the first printing fluid into the at least one engraving, applying, by the at least one ink collecting cylinder (12) or the at least one inking unit (18), the first printing fluid into the at least one engraving having the second printing fluid therein, during printing, depositing concurrently the first printing fluid and the second printing fluid from the at least one engraving onto the at least one substrate (10), the second printing fluid forming, at least in part, at least one layer and/or at least one film on the first printing fluid deposited on the at least one substrate (10), the second printing fluid having a drying and/or curing behavior that is different from a drying and/or curing behavior of the first printing fluid.

19. The method according to claim 18, characterized in that the at least one substrate (10) having the first printing fluid and the second printing fluid printed thereon is delivered onto a delivery pile at a delivery, or is rolled up at the delivery, and that the second printing fluid is configured to be dry and/or cured prior to the at least one substrate (10) arriving at the delivery, and that the first printing fluid is configured to not be dry and/or cured prior to the at least one substrate (10) arriving at the delivery.

20. The method according to claim 18, characterized in that the second printing fluid is configured to be transparent, and/or that the second printing fluid is embodied as varnish and/or as UV varnish, and/or that the second printing fluid is configured to serve, at least in part, as a separating agent between the at least one engraving and the first printing fluid, and/or that, following applying the first printing fluid to the at least one engraving, the first printing fluid is layered, at least in part, on the second printing fluid inside the at least one engraving.

* * * * *